(No Model.)

E. A. SMYTH.
Churn.

No. 241,889.  Patented May 24, 1881.

Witnesses:
M. M. Lacey
J. B. Holderby

Inventor.
Emory A. Smyth
By R. S. & A. P. Lacey Attys:

N. PETERS. Photo-Lithographer. Washington, D. C.

UNITED STATES PATENT OFFICE.

EMORY A. SMYTH, OF MORRISTOWN, OHIO.

CHURN.

SPECIFICATION forming part of Letters Patent No. 241,889, dated May 24, 1881.

Application filed September 24, 1880. (No model.)

*To all whom it may concern:*

Be it known that I, EMORY A. SMYTH, a citizen of the United States, residing at Morristown, in the county of Belmont and State of Ohio, have invented certain new and useful Improvements in Churns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish an improved churn of novel construction and arrangement of parts, which will be hereinafter fully explained and claimed.

Figure 1:
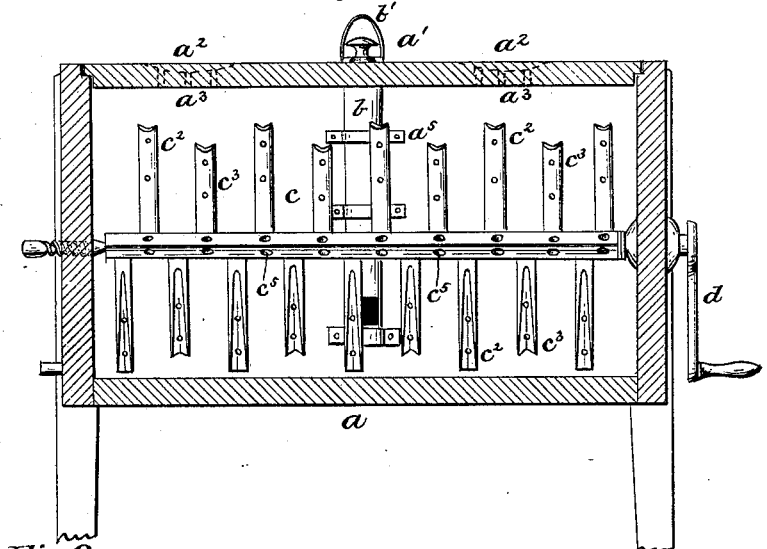
Figure 2:
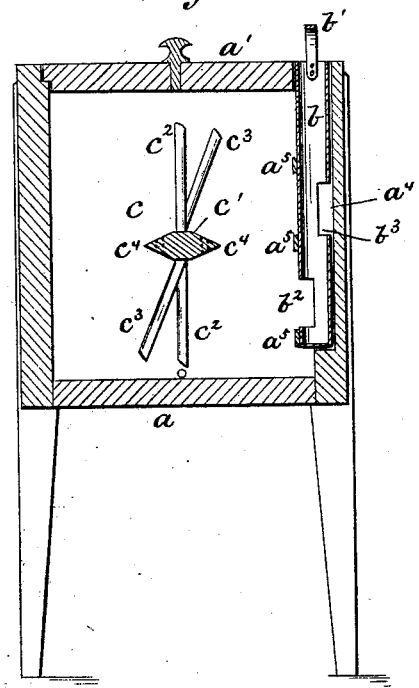
Figure 3:
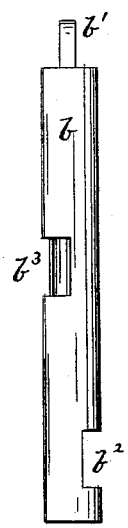
Figure 4:
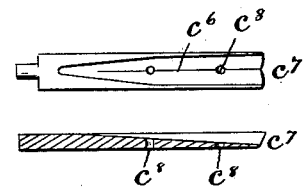

In the drawings, Figure 1 is a vertical longitudinal section. Fig. 2 is a vertical cross-section. Fig. 3 is a side elevation of the air-tube, and Fig. 4 shows one of the paddles.

$a$ is the churn-box or milk-reservoir, which is supported on suitable legs, as shown. It is oblong and rectangular in shape, and has a lid, $a'$, which fits snugly into suitable rabbets, and is provided with concave recesses $a^2$ and openings $a^3$, through which water may be poured into the milk.

$b$ is the air-tube, which is cylindrical in shape, open at its upper end and closed at its lower end, and is furnished with a suitable handle, $b'$, by which it is lifted from or lowered into its place in the churn. It slides into a vertical half-round mortise, $a^4$, formed in one side of the churn, and is held by a series of small straps, $a^5$. A suitable opening is formed in the edge of the lid, so that the tube can be slipped into its place without removing the said lid. In the sides of the tube I form two openings, $b^2$ $b^3$, arranged on opposite sides, the one near the lower end and the other at a point slightly above the plane of the axis of the breakers. By turning the tube one or the other of these openings will be drawn into the half-round mortise and closed, while the other will be open toward the breakers to admit air to the surface of the milk.

In churning the best results are attained when the milk is not filled in above the axis, but just to or below the latter. It is also found to give the best results to have the required air introduced just at or very near the surface of the milk. My tube $b$ is constructed for this purpose. If the reservoir $a$ be filled to or slightly above the axis, the opening $b^3$ is turned outward. If the milk be low in the reservoir, the opening $b^2$ is turned outward, and the upper opening, $b^3$, is closed by being turned into the mortise $a^4$. If the milk be above the axis, the tube can be raised so as to bring the opening $b^3$ flush with the surface of the fluid. Thus it will be seen the air is always introduced at the proper point.

The rotary dasher $c$ is composed of a central shaft, $c'$, and the two series of beater-arms $c^2$ and $c^3$. The shaft $c'$ is in the form of two wedges having their bases joined together and their points extended laterally in the same horizontal plane and at right angles to the series of radial arms $c^2$, and to a distance equal to about one-third the length of said arms. Through the lateral projecting wings or extensions of shaft $c'$ there are formed a series of openings, $c^5$, parallel with the radial arms $c^2$, and consequently vertical to the horizontal plane in which the points $c^4$ $c^4$ are arranged.

I employ two series of paddles, the inner ends of which are fixed in the shaft. One series, $c^2$, is fixed on lines radial to the center of motion of the shaft. The other series is arranged at a tangent to the center of motion of said shaft. There are two sets of each series, one set being fixed on the opposite side of the shaft from the other set. Each paddle in both series is made as shown in Fig. 4. A longitudinal V-shaped channel, $c^6$, is formed on the forward side, and extends from the inner to the outer end, and gradually increases in depth and width outwardly from the shaft, and forms the outer extremity into a thin edge, $c^7$, as shown. A series of holes, $c^8$, are made from the bottom of the channel $c^6$ through the beater.

$d$ is the crank for turning the breaker.

In the operation of this device the cream is given a confused or irregular rolling movement by means of the extension $c^4$ and arms $c^2$ and $c^3$, and is so rapidly churned that it is soon broken.

In the ordinary rotary churn the milk will be drawn by the form of the dasher into a regular rotary motion, having a velocity about equal with the movement of the shaft and its paddles.

The object of my construction and arrangement of parts is to check the velocity of the milk, so that the paddles can act with greater effect to break the milk. I accomplish this object by having the paddles set at different relative angles to center of motion, and by the openings $c^5$ through the wings of the shaft. A portion of the milk will pass through the openings $c^5$, and will be projected outward on a line about parallel with the radial paddles and across the line of movement of the body of milk at the outer ends of said paddles. This opposing jet or current checks the rotary movement of the main body of milk, so that the latter moves slower than the paddles. The two series of paddles have their inner ends fixed to the shaft on the same longitudinal line, as shown. The jet of milk through the openings $c^5$ will be thrown outward in front of the inner ends of both series and parallel with the series $c^2$, and against the outer ends of the forwardly-inclined series $c^3$, thus creating counter currents and eddyings of the fluid.

Having thus described my invention, what I claim, and desire to secure by Letters Patent, is—

1. In a rotary churn, a dasher composed of a shaft constructed with opposite wedge-shaped wings provided with a series of openings formed through the same vertically to the plane in which the points of said wings are arranged, a series of radial paddles fixed at right angles to the plane in which the points of the wedge-shaped wings of the shaft are arranged, and a series of inclined paddles having their inner ends fixed to the shaft on the same longitudinal line with the radial paddles, and their outer ends inclined forward over the lateral wings of the shaft, substantially as and for the purposes set forth.

2. The combination, with the box $a$, having a vertical half-round mortise, $a^4$, made in its side, and a suitable opening in the lid, of the air-tube $b$, constructed with openings $b^2$ and $b^3$, arranged on opposite sides and one above the other, and retaining-straps $a^5$, the tube being placed within the mortise $a^4$ and held by the straps, so that it may be turned round or adjusted or removed vertically, substantially as and for the purposes set forth.

In testimony whereof I affix my signature in presence of two witnesses.

EMORY A. SMYTH. [L. S.]

Witnesses:
JOHN V. FISHER,
W. B. MORGAN.